US006674925B1

(12) United States Patent
Schoepflin et al.

(10) Patent No.: US 6,674,925 B1
(45) Date of Patent: Jan. 6, 2004

(54) MORPHOLOGICAL POSTPROCESSING FOR OBJECT TRACKING AND SEGMENTATION

(75) Inventors: Todd Schoepflin, Seattle, WA (US); Yongmin Kim, Seattle, WA (US)

(73) Assignee: University of Washington, Seattle, WA (US)

(*) Notice: Subject to any disclaimer, the term of this patent is extended or adjusted under 35 U.S.C. 154(b) by 0 days.

(21) Appl. No.: 09/500,259

(22) Filed: Feb. 8, 2000

(51) Int. Cl.[7] .......................... G06K 9/56; H04N 5/225
(52) U.S. Cl. ..................... 382/308; 382/103; 382/275; 348/169
(58) Field of Search ................. 382/103, 173, 382/190, 212, 213, 215, 216, 217, 256, 257, 263, 266, 268, 275, 308; 348/170, 155, 661, 169; 345/563

(56) References Cited

U.S. PATENT DOCUMENTS

| | | | | |
|---|---|---|---|---|
| 5,091,967 A | * | 2/1992 | Ohsawa | 382/132 |
| 5,268,967 A | * | 12/1993 | Jang et al. | 382/172 |
| 5,917,936 A | * | 6/1999 | Katto | |
| 5,969,755 A | * | 10/1999 | Courtney | 348/143 |
| 6,217,520 B1 | * | 4/2001 | He et al. | 600/467 |
| 6,297,889 B1 | * | 10/2001 | Loce et al. | 358/1.9 |
| 6,400,831 B2 | * | 6/2002 | Lee et al. | 382/103 |

OTHER PUBLICATIONS

Kevrann, c.; "A Hierarchical Markov Modeling Approach for the Segmentation and Tracking of Deformable Shapes," Graphical Models and Image Processing vol. 60 No 3 May 1998, pp 173–195.

Jain, A.; "Object Matching Using Deformable Templates," IEEE Trans on Pattern Analysis and Mahine Intelligence Vol 18 No 3 Mar. 1996.

Meyer et al.; "Region–Based Tracking Using Affine Motion Models in Long Image Sequences," Image Understanding Vol 60 no 2 9/94 pp 119–140.

Zhong et al.; "Object Tracking Using Deformable Templates," 6th Int'l Conf. on Computer Vision (India) 1/98.

Singh et al."Comparison of Daubechies, Coiflet and Symlet for Edge Detection" SPIE vol. 3074; 1997.

Amini et al., "Using dynamic Programming for Sloving Variational Problems in Vision;" IEEE Trans on Pattern Analysis and Machine Intelligence V12 n9 9/90.

Fujimara et al.; Motion Tracking of Deformable Objects Based on Energy Minimization Using Multiscale Dynamic Programming 8186–2910 IEEE 1992.

Kakadiaris et al.; "Inferring 2D Object Structure from the Deformation of Apparent Contours;" Computer Vision and Image Understanding V65 n2 2/97.

Kass et al.; "Snakes: Active Contour Models;" Int'l Journal of Computer Vision pp 321–331; 1988.

Lai et al.; "Deformable Contours: Modeling and Extraction," IEEE Transaction on Pattern Analysis and Machine Intelligence, V17, n11, 11/95.

(List continued on next page.)

*Primary Examiner*—Bhavesh M. Mehta
*Assistant Examiner*—Kanji Patel
(74) *Attorney, Agent, or Firm*—Steven P. Koda

(57) ABSTRACT

An object mask and a set of control points defined for a given frame are subjected to morphological processing to remove false edge points and provide a more robust mask for use in tracking the object in a next frame. The morphological processing is performed on a frame by frame basis corresponding to object tracking so that errors added in by the object tracker do not accumulate, and instead are filtered out. Rapidly moving objects which are troublesome for edge-based object trackers are more readily tracked. Also, regions of low contrast or regions locked onto in the background when trying to identify the object are more readily distinguished and eliminated from the object mask.

15 Claims, 4 Drawing Sheets

OTHER PUBLICATIONS

Leymarie et al.; "Tracking Deformable objects in the Plane Using an Active Contour Model," IEEE Trans on Pattern Analaysis & Mach Int V15 n6 6/93.

Terzopouliis et al.; "Deformable Models," The Visual Computer, Springer–Verlag 1998.

Yuille et al.; "Feature Extraction from Faces Using DeformableTemplates," Int'l Journal of Computer Vision 8:2 pp 99–111; 1992.

Staib et al.; "Boundary Finding with Parametrically Deformable Models," IEEE Trans on Pattern Analysis and Machine Int. V14, n11; 11/92.

Blake et al.; "A Framework for Spatiotemporal Control in the Tracking of Visual Contours," Int'l Journal of Computer Vision 11:2, pp127–145; 1993.

\* cited by examiner

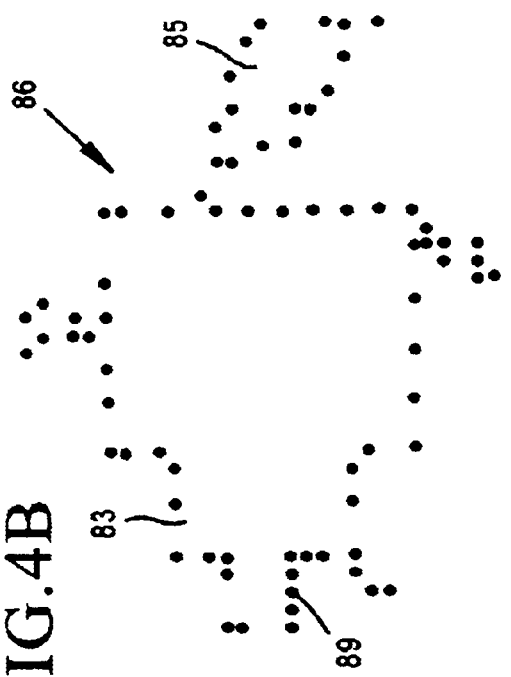
FIG.4A
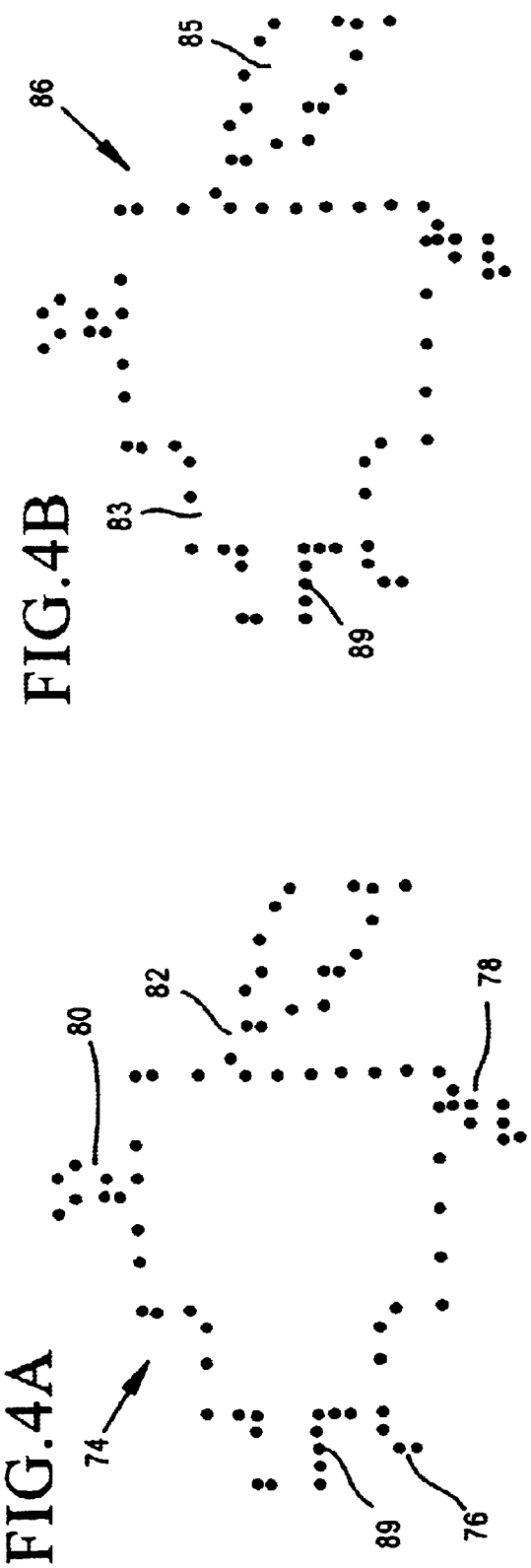
FIG.4B
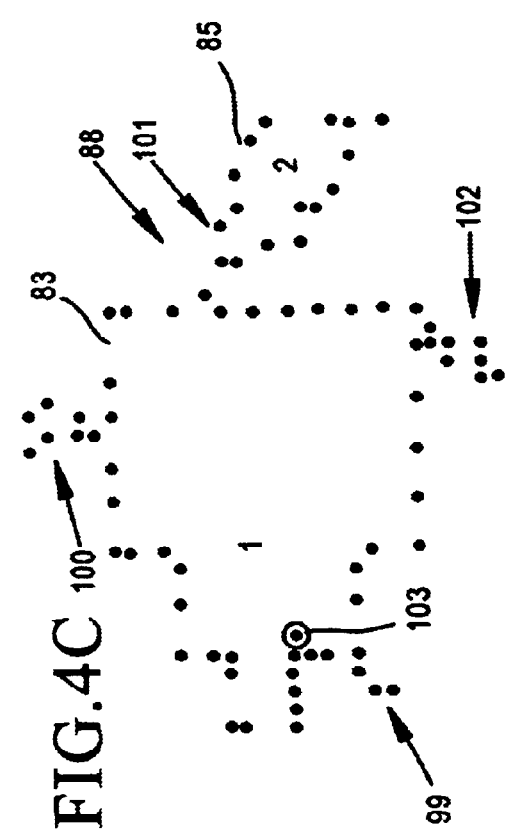
FIG.4C
FIG.4D

MORPHOLOGICAL POSTPROCESSING FOR OBJECT TRACKING AND SEGMENTATION

CROSS REFERENCE TO RELATED APPLICATIONS

This invention is related to U.S. patent application Ser. No. 09/323,501 filed Jun. 10, 1999 naming Sun et al. titled, "Video Object Segmentation Using Active Contour Model with Global Relaxation;" and U.S. patent application Ser. No. 09/500,403 filed Feb. 8. 2000, naming Schoepflin et al. titled, "Video Object Tracking Using a Hierarchy of Deformable Templates." The content of all such applications are incorporated herein by reference and made a part hereof.

BACKGROUND OF THE INVENTION

This invention relates to object tracking within a sequence of image frames, and more particularly to methods and apparatus for improving robustness of edge-based object tracking processes.

When tracking an object among multiple frames of a video sequence, the object boundary is identified in each frame. The object is the area within the boundary. The challenge in identifying the object boundary in a given frame increases as the constraints on a trackable object are relaxed to allow tracking an object which translates, rotates or deforms. Once the object is identified in one frame, template matching may be used in a subsequent frame to detect translation of the object. The template typically is the object as identified in the prior frame. Deformable models are used to detect objects which translate, rotate or deform. Various methods using deformable models are described below.

Edge-based segmentation algorithms for object tracking, such as an active contour model have been used for adjusting image features, in particular image object boundaries. In concept, active contour models involve overlaying an elastic curve onto an image. The curve (i.e., snake) deforms itself from an initial shape to adjust to the image features. An energy minimizing function is used which adapts the curve to image features such as lines and edges. The function is guided by external constraint forces and image forces. The best fit is achieved by minimizing a total energy computation of the curve. In effect, continuity and smoothness constraints are imposed to control deformation of the model. The model is the object from a prior frame. A shortcoming of the active contour model is that small changes in object position or shape from one frame to the next may cause the boundary identification to fail. In particular, rather than following the object, the estimated boundary instead latches onto strong false edges in the background, distorting the object contour.

Yuille et al. in "Feature Extraction from Faces Using Deformable Templates," International Journal of Computer Vision, Vol. 8, 1992, disclose a process in which eyes and mouths in an image are identified using a model with a few parameters. For example, an eye is modeled using two parabolas and a circle radius. By changing the shape of the parabolas and the circle radius, eyes can be identified. Yuille et al. and other deformation models typically have encompassed only highly constrained deformations. In particular, the object has a generally known shape which may deform in some generally known manner. Processes such as an active contour model have relaxed constraints, but are only effective over a very narrow spatial range of motion. Processes like that disclosed by Yuille are effective for a wider spatial range of motion, but track a very constrained type of motion. Accordingly, there is a need for a more flexible and effective object tracker, which can track more active deformations over a wider spatial range.

SUMMARY OF THE INVENTION

According to the invention, a morphological process is performed as part of an object tracking and segmentation sequence. With an object tracked and segmented for a given frame, the morphological process smooths the resulting contour and removes erroneous edge points.

Edge-based object trackers have difficulty handling objects which move or change too rapidly. The limited search area of the tracker makes it difficult to follow the edge reliably. Consequently the tracker may identify a region of low contrast or lock onto an edge in the background when trying to identify the object. Such errors are reduced by the morphological process. In addition, edge-based object trackers have difficulty handling occlusions, because they latch onto the strong edge of the occluding object rather than the true object boundary. Such errors also are reduced by the morphological process.

Edge-based object trackers accumulate errors rapidly because the template for one frame is the detected object from the prior frame. As a result the edge-based object tracker may be unable to recover from an error. By performing the morphological process on a frame by frame basis, errors in the object tracker do not accumulate, and instead are filtered out.

According to one advantage of the invention, false edge points are more reliably removed when performing the morphological process after the object tracking and segmentation processes. By performing this postprocessing on a frame by frame basis errors are eliminated early and do not accumulate from frame to frame. Thus, the object boundary is more reliably identified and tracked from frame to frame.

According to an aspect of this invention, the morphological process receives an input corresponding to an object mask and a set of control points for the object. At one step the mask is filtered to eliminate extraneous control points. The purpose of such step is to eliminate image pixels which the object tracker tagged on around a control point due to sharp contrast, (e.g., sharp background contrasts). At another step the mask is expanded to recover certain control points eliminated during the first step. After the first two steps one or more islands may remain as the mask. At another step, one of the islands is selected as the mask. At another step any control points not on the mask boundary are removed. The final mask and set of control points then are output (i) for use in displaying the tracked object for the current image frame, and (ii) for use in identifying and tracking the object in the next image frame.

These and other aspects and advantages of the invention will be better understood by reference to the following detailed description taken in conjunction with the accompanying drawings.

BRIEF DESCRIPTION OF THE DRAWINGS

FIGS. 4A–4D are illustrations of a sample mask and set of control points as revised at various steps of the morphological processing method of FIG. 3.

DESCRIPTION OF SPECIFIC EMBODIMENTS

Overview

Figure 1:
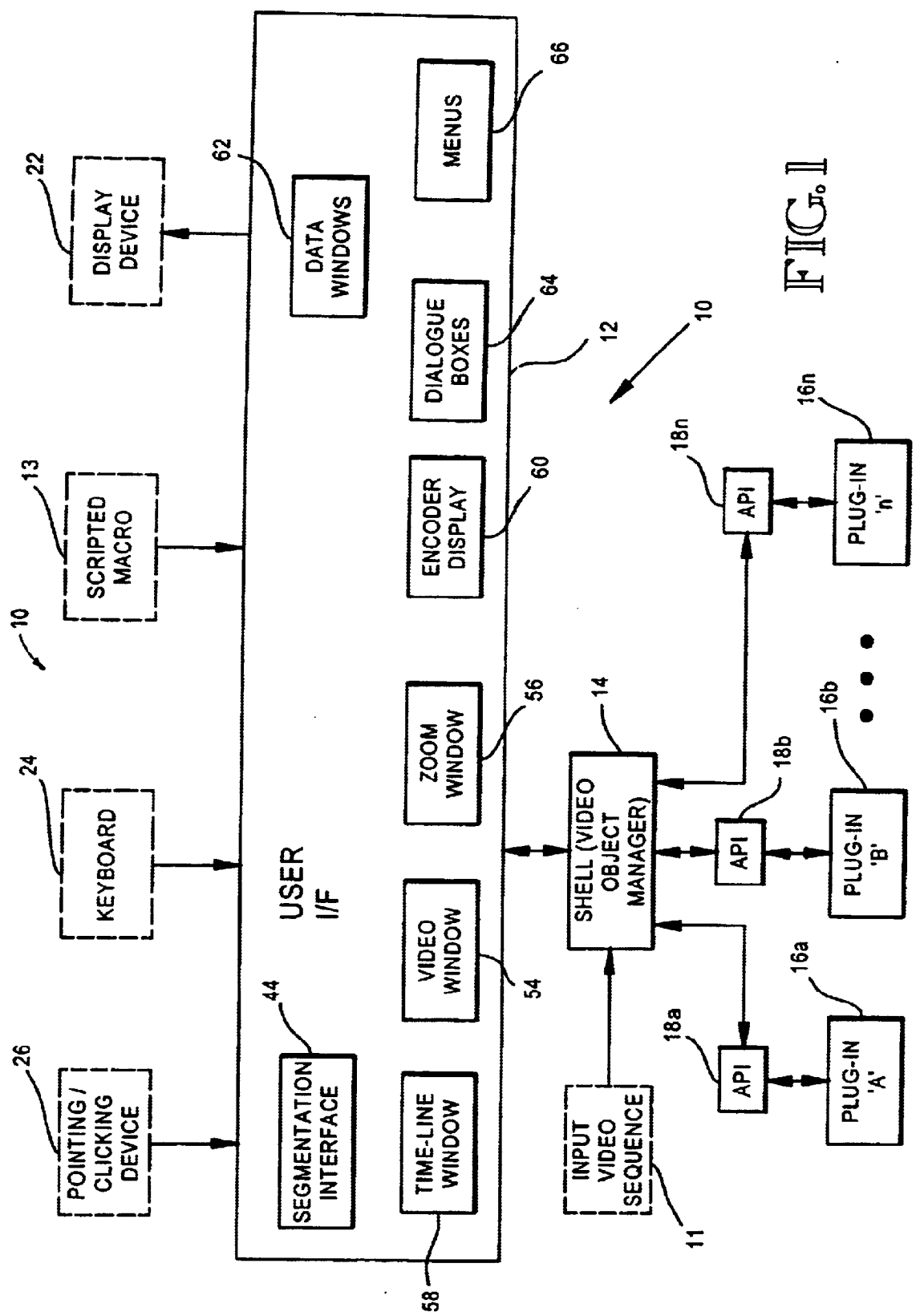
FIG. 1 is a block diagram of an interactive processing environment for tracking video objects among a sequence of video frames.

FIG. 1 shows a block diagram of an interactive processing environment 10 for locating, tracking and encoding video objects. The processing environment 10 includes a user interface 12, a shell environment 14 and a plurality of functional software 'plug-in' programs 16. The user interface receives and distributes operator inputs from various input sources, such as a point and clicking device 26 (e.g., mouse, touch pad, track ball), a key entry device 24 (e.g., a keyboard), or a prerecorded scripted macro 13. The user interface 12 also controls formatting outputs to a display device 22. The shell environment 14 controls interaction between plug-ins 16 and the user interface 12. An input video sequence 11 is input to the shell environment 14. Various plug-in programs 16a–16n may process all or a portion of the video sequence 11. One benefit of the shell 14 is to insulate the plug-in programs from the various formats of potential video sequence inputs. Each plug-in program interfaces to the shell through an application program interface ('API') module 18.

Figure 2:
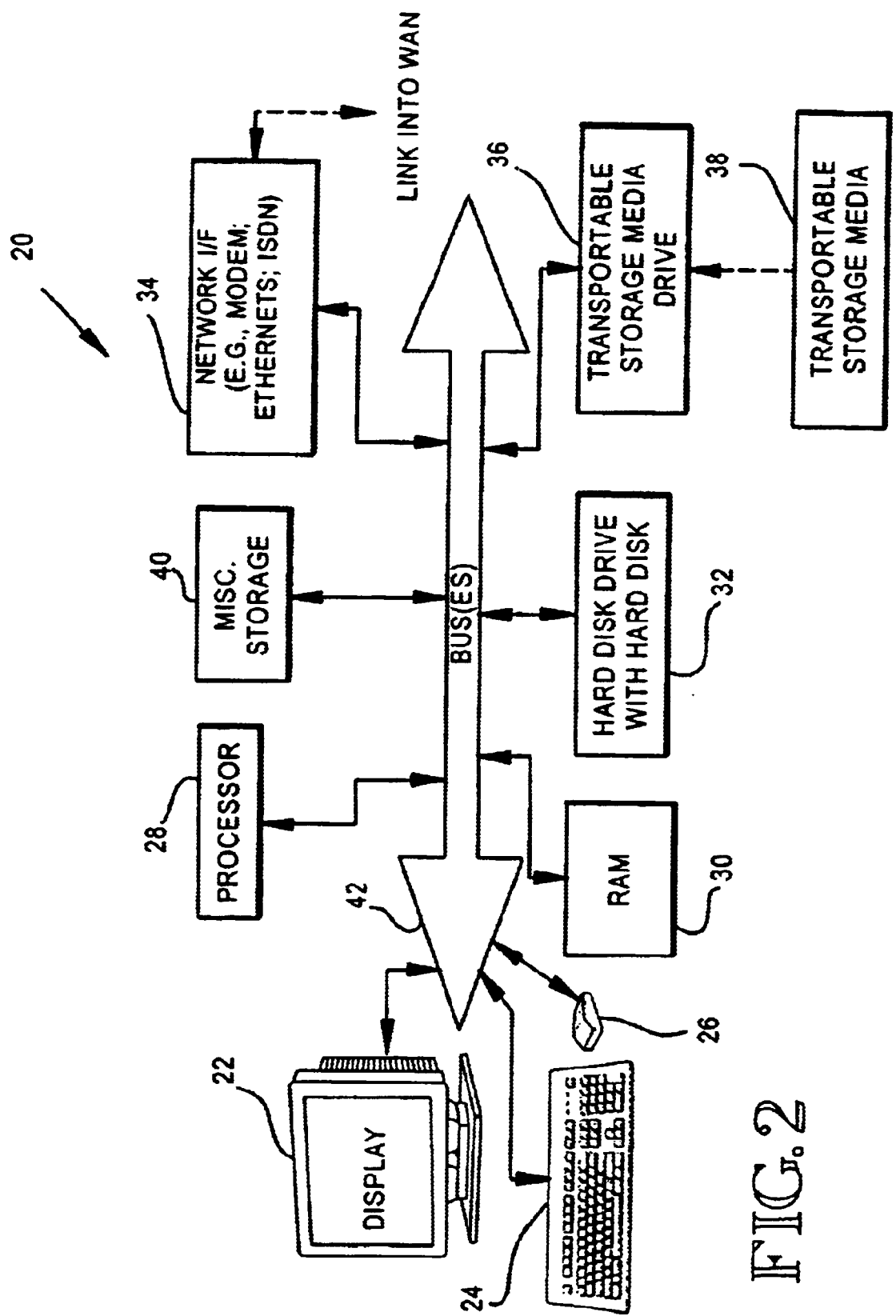
FIG. 2 is a block diagram of an exemplary host computing system for the interactive processing environment of FIG. 1.

In one embodiment the interactive processing environment 10 is implemented on a programmed digital computer of the type which is well known in the art, an example of which is shown in FIG. 2. A computer system 20 has a display 22, a key entry device 24, a pointing/clicking device 26, a processor 28, and random access memory (RAM) 30. In addition there commonly is a communication or network interface 34 (e.g., modem; ethernet adapter), a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more buses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer, a networked client computer or a stand alone computer. The computer system 20 may even be configured as a workstation, personal computer, or a reduced-feature network terminal device.

In another embodiment the interactive processing environment 10 is implemented in an embedded system. The embedded system includes similar digital processing devices and peripherals as the programmed digital computer described above. In addition, there are one or more input devices or output devices for a specific implementation, such as image capturing.

Software code for implementing the user interface 12 and shell environment 14, including computer executable instructions and computer readable data are stored on a digital processor readable storage media, such as embedded memory, RAM, ROM, a hard disk, an optical disk, a floppy disk, a magneto-optical disk, an electro-optical disk, or another known or to be implemented transportable or non-transportable processor readable storage media. Similarly, each one of the plug-ins 16 and the corresponding API 18, including digital processor executable instructions and processor readable data are stored on a processor readable storage media, such as embedded memory, RAM, ROM, a hard disk, an optical disk, a floppy disk, a magneto-optical disk, an electro-optical disk, or another known or to be implemented transportable or non-transportable processor readable storage media. The plug-ins 16 (with the corresponding API 18) may be bundled individually on separate storage media or together on a common storage medium. Further, none, one or more of the plug-ins 16 and the corresponding API's 18 may be bundled with the user interface 12 and shell environment 14. Further, the various software programs and plug-ins may be distributed or executed electronically over a network, such as a global computer network.

Under various computing models, the software programs making up the processing environment 10 are installed at an end user computer or accessed remotely. For stand alone computing models, the executable instructions and data may be loaded into volatile or non-volatile memory accessible to the stand alone computer. For non-resident computer models, the executable instructions and data may be processed locally or at a remote computer with outputs routed to the local computer and operator inputs received from the local computer. One skilled in the art will appreciate the many computing configurations that may be implemented. For non-resident computing models, the software programs may be stored locally or at a server computer on a public or private, local or wide area network, or even on a global computer network. The executable instructions may be run either at the end user computer or at the server computer with the data being displayed at the end user's display device.

Shell Environment and User Interface

The shell environment 14 allows an operator to work in an interactive environment to develop, test or use various video processing and enhancement tools. In particular, plug-ins for video object segmentation, video object tracking, morphological processing and video encoding (e.g., compression) are supported in a preferred embodiment. The interactive environment 10 with the shell 14 provides a useful environment for creating video content, such as MPEG-4 video content or content for another video format. A pull-down menu or a pop up window is implemented allowing an operator to select a plug-in to process one or more video frames.

In one embodiment the shell 14 includes a video object manager. A plug-in program 16, such as a segmentation program accesses a frame of video data, along with a set of user inputs through the shell environment 14. A segmentation plug-in program identifies a video object within a video frame. The video object data is routed to the shell 14 which stores the data within the video object manager module. Such video object data then can be accessed by the same or another plug-in 16, such as a tracking program or morphological processing program. The tracking program identifies the video object in subsequent video frames. The morphological processing in one embodiment is part of the tracking, serving to refine the object shape. In an alternative embodiment the morphological process is part of a separate plug-in program which performs postprocessing on a frame to refine the object shape. Data identifying the video object in each frame is routed to the video object manager module. In effect video object data is extracted for each video frame in which the video object is tracked. When an operator completes all video object extraction, editing or filtering of a video sequence, an encoder plug-in 16 may be activated to encode the finalized video sequence into a desired format. Using such a plug-in architecture, the segmentation plug-in, tracking plug-in and morphological plug-in do not need to interface to the encoder plug-in. Further, such plug-ins do not need to support reading of several video file formats or create video output formats. The shell handles video input compatibility issues, while the user interface handles display formatting issues. The encoder plug-in handles creating a run-time video sequence.

For a Microsoft Windows operating system environment, the plug-ins 16 are compiled as dynamic link libraries. At processing environment 10 run time, the shell 14 scans a predefined directory for plug-in programs. When present, a plug-in program name is added to a list which is displayed in a window or menu for user selection. When an operator selects to run a plug-in 16, the corresponding dynamic link library is loaded into memory and a processor begins executing instructions from one of a set of pre-defined entry points for the plug-in. To access a video sequence and video object segmentations, a plug-in uses a set of callback functions. A plug-in interfaces to the shell program 14 through a corresponding application program interface module 18.

In addition, there is a segmentation interface 44 portion of the user interface 12 which is supported by a segmentation plug-in. The segmentation interface 44 makes calls to a segmentation plug-in to support operator selected segmentation commands (e.g., to execute a segmentation plug-in, configure a segmentation plug-in, or perform a boundary selection/edit).

The API's 18 typically allow the corresponding plug-in to access specific data structures on a linked need-to-access basis only. For example, an API serves to fetch a frame of video data, retrieve video object data from the video object manager, or store video object data with the video object manager. The separation of plug-ins and the interfacing through API's allows the plug-ins to be written in differing program languages and under differing programming environments than those used to create the user interface 12 and shell 14. In one embodiment the user interface 12 and shell 14 are written in C++. The plug-ins can be written in any language, such as the C programming language.

In a preferred embodiment each plug-in 16 is executed in a separate processing thread. As a result, the user interface 12 may display a dialog box that plug-ins can use to display progress, and from which a user can make a selection to stop or pause the plug-in's execution.

Referring again to FIG. 1, the user interface 12 includes the segmentation interface 44 and various display windows 54–62, dialogue boxes 64, and menus 66 along with supporting software code for formatting and maintaining such displays. In a preferred embodiment the user interface is defined by a main window within which a user selects one or more subordinate windows, each of which may be concurrently active at a given time. The subordinate windows may be opened or closed, moved and resized.

In a preferred embodiment there are several subordinate windows, including a video window 54, a zoom window 56, a time-line window 58, one or more encoder display windows 60, and one or more data windows 62. The video window 54 displays a video frame or a sequence of frames. For viewing a sequence of frames, the frames may be stepped, viewed in real time, viewed in slow motion or viewed in accelerated time. Included are input controls accessible to the operator by pointing and clicking, or by predefined key sequences. There are stop, pause, play, back, forward, step and other VCR-like controls for controlling the video presentation in the video window 54. In some embodiments there are scaling and scrolling controls also for the video window 54.

The zoom window 56 displays a zoom view of a portion of the video window 54 at a substantially larger magnification than the video window. The time-line window 58 includes an incremental time-line of video frames, along with zero or more thumb nail views of select video frames. The time line window 58 also includes a respective time-line for each video object defined for the input video sequence 11. A video object is defined by outlining the object.

The data window 62 includes user-input fields for an object title, translucent mask color, encoding target bit rate, search range and other parameters for use in defining and encoding the corresponding video object.

During encoding one of the encoder windows 60 is displayed. For example, an encoder progress window shows the encoding status for each defined video object in the input video sequence 11.

Video Object Tracking and Segmentation

To track an object, the first step is to define a template to use which corresponds to the object. In one embodiment an operator loads in an input video sequence and selects points or line segments approximating a boundary of the object. A local segmentation algorithm then is applied to more accurately define the boundary. The operator may adjust points on the boundary to refine the boundary, and re-execute the segmentation algorithm using the refined boundary points to achieve a desired and accurate object. Such object serves as an initial template for locating the object in another frame.

The located object in a given frame serves as the initial template when searching for the object in the next frame to be processed. Such next frame may be the succeeding image frame in the video sequence, or the next frame to be sampled in the video sequence, or any other frame, either in sequence or out of sequence, which is the next frame to be processed. According to such approach the initial template is always changing for each frame to be processed. Detailed descriptions of an object tracking process and an object segmentation process are described in commonly-assigned U.S. patent application Ser. No. 09/323,501 filed Jun. 10, 1999 naming Sun et al. titled, "Video Object Segmentation Using Active Contour Model with Global Relaxation;" and in commonly-assigned U.S. patent application Ser. No. 09/500,403 filed Feb. 8, 2000, naming Schoepflin et al. titled, "Video Object Tracking Using a Hierarchy of Deformable Templates," the contents of such application being incorporated herein by reference and made a part hereof.

Morphological Processing

Preferably, the morphological process is performed on the results of each frame processed by the object tracker. The object tracker identifies the object for a given frame of image data, then the morphological process refines the object mask and list of control points used to identify the object. In an alternative embodiment the morphological process is performed for each n-th frame processed by the image tracker. In various embodiments n is equal to one, is greater than one or may vary.

Figures 3, 5:
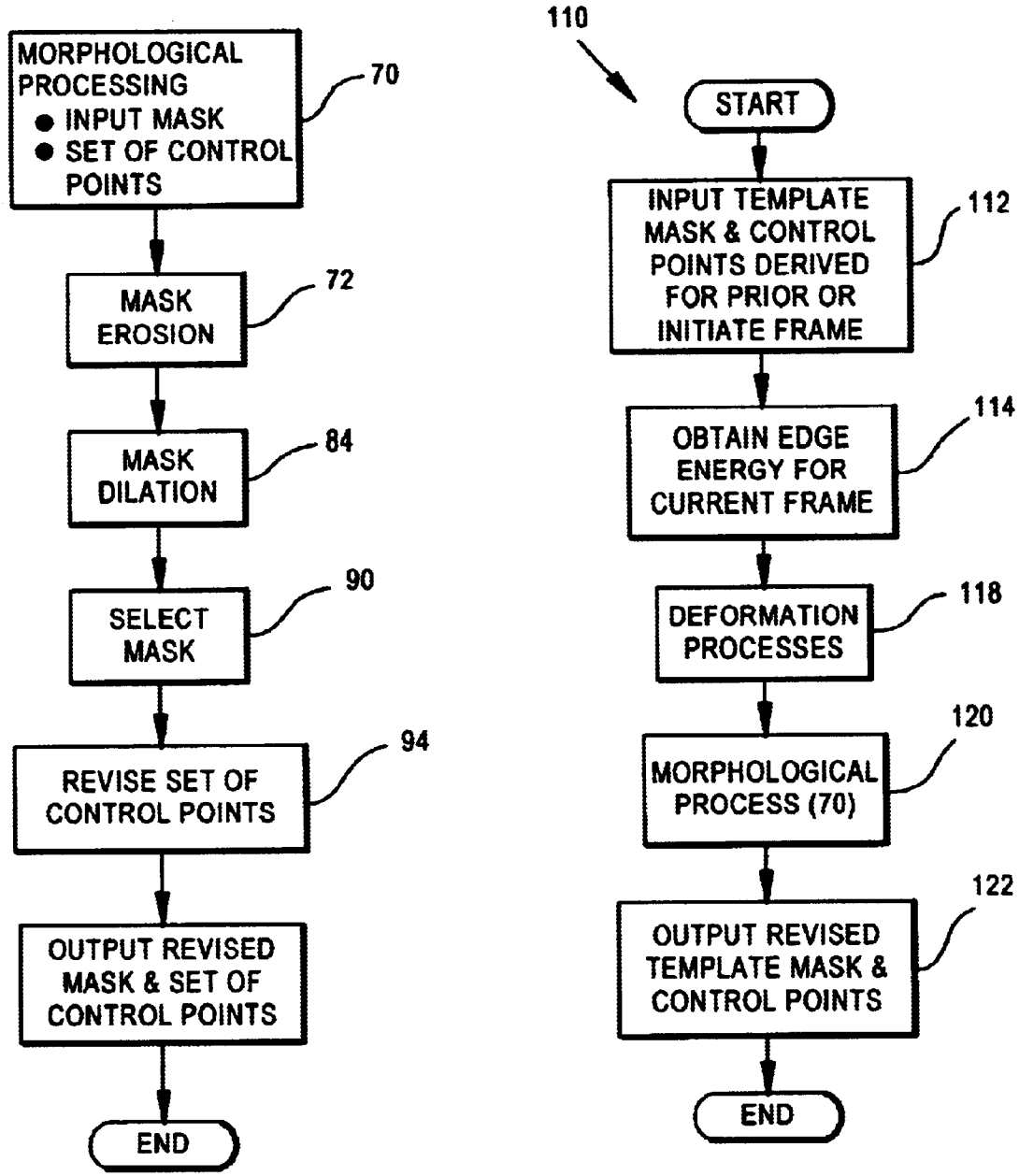
FIG. 3 is a flow chart of a morphological processing method according to an embodiment of this invention.
FIG. 5 is a flow chart of an object tracking scenario according to an embodiment of this invention.

Referring to FIG. 3, a flow chart of one embodiment of a morphological process 70 is shown. Input to the process 70 is a segmentation mask of the object identified by the object tracker, along with the control points. The object mask is a binary mask which has one value for pixels which are part of the mask and another value for pixels which are not part of the mask. The set of all pixels corresponds to the image data frame. The mask overlaying the image data frame identifies the object within the image data frame. The set of control points are the edge points defining a closed object boundary. Initially such control points are sampled subset of all boundary points of an initial object. As the object is tracked, movement or deformation of the object leads to movement of the control points.

At step 72, the mask is morphologically 'eroded' to eliminate portions of the received mask. It has been observed that edge-detection algorithms tend to latch onto sharp edges in the background and attach them to the mask. The purpose of this step is to eliminate such tagged-on portions. In one embodiment this is achieved by removing features included in the mask which are less than a prescribed number of pixels wide (e.g., 3 pixels wide). Referring to FIG. 4A, an example of an input mask 74 has several areas 76, 78, 80, 82 meeting such criteria. FIG. 4B shows the result of step 72. Note that the area 82 of the areas meeting the criteria connects one part of the mask to another like an isthmus. As a result two islands 83, 85 are achieved after step 72. Note that this is merely an example of a mask used for purposes of illustrating the operation of the morphological process. The mask received to the morphological process for any given frame will vary depending on the image data stream and the object selected to be tracked.

In one embodiment the test for defining the pixels remaining in the mask after step 72 is: "retain any pixel that has its eight surrounding neighbor pixels within the input mask." All other pixels are eliminated from the input mask 74. The result is a morphologically-eroded mask 86. For purposes of clarity the mask received by the morphological process is called the "received mask" or the "input mask," and is indicated by numeral 74 in the example shown in FIG. 4A. The mask as morphologically eroded after step 72 is referred to as the "eroded mask," as is indicated by numeral 86 in FIG. 4B. In comparing FIG. 4A with FIG. 4B, one can see that not only the tails and isthmuses of the input mask 74 are removed, but also the edge control points 89 are removed. At step 84, the eroded mask 86 is 'dilated' to recover some of these edge points. In one embodiment the criteria for step 84 is to add a pixel to the eroded mask if any one or more of its surrounding 8 neighboring pixels are in the eroded mask. The result is the dilated mask 88. The steps of eroding and dilating the mask are referred to as morphologically opening the mask.

At step 90, if multiple islands 83, 85 remain as shown in FIG. 4C, then the island 83 having the largest number of control points is selected as the output mask 92, as shown in FIG. 4D. At step 94, the list of control points is edited to select only those control points which are on the mask border as control points. Any control points not part of the mask are no longer considered control points. Any control points on the interior of the output mask 92 are no longer considered to be control points. Thus, only control points which reside on the boundary of the output mask remain as control points. Comparing FIGS. 4C and 4D, control points 99, 100, 101 and 102 are no longer indicated as being control points for the output mask 92 of FIG. 4D. Also note that control point 103 is no longer identified as being a control point for the output mask 92.

Revised Object Tracking Scenario

Referring to FIG. 5, a flow chart 110 of a tracking methodology is shown for an embodiment of this invention. At the entry point, the object to be tracked has already been selected by the operator. In addition a segmentation algorithm has been applied to accurately depict the object boundary and store a template of the object, including the object boundary. Any of various known segmentation algorithms, (e.g., an active contour model) are used to identify the template of the object.

At step 112, an initial template mask for the current image frame being processed is obtained by receiving the control points resulting from a prior frame (or the sampled edge points from an initial frame). As described above, the initial template mask preferably is the enclosed mask corresponding to the final object boundary estimate determined in a prior frame, and changes for each frame processed.

In a preferred embodiment the template mask is define parametrically or explicitly. For example in one embodiment the template mask is defined by a set of explicit (x,y) coordinate pairs. The template mask is deformed to minimize some energy metric. In general, the total energy of the template mask is the sum of internal template mask strains and external energy from the current image frame. Other than for the local segmentation steps, the internal energy does not contribute to the total energy. This is because in the local segmentation algorithm (having the least deformation constraints) all deformations within the given set of constraints are equally valid. Typically, the external energy is defined as an integral of the energy image around a contour $\Omega$. Discretization occurs by summation over the pixels on the template boundary.

$$E_{ext} = \int_\Omega E(s)ds \cong \sum_{(x,y)\in\Omega} E(x_i, y_i)$$

At step 114 a current image frame among a plurality of image frames is processed to obtain an edge energy representation of the image frame. In one embodiment a Canny edge detection algorithm generates a binary image representation of an image's edges, (e.g., pixels on edge=1; pixel's not on edge=0). A distance transform then is applied to the binary image to obtain the energy image. In another embodiment, a wavelet decomposition algorithm is implemented to define the edge energy representation. With color image frames the wavelet decomposition algorithm is preferred. A Canny edge detector algorithm is described in "A Computational Approach to Edge Detection," by John Canny, IEEE Transactions on Pattern Analysis and Machine Intelligence, PAMI-8(6), 1986, pages 679–698. A wavelet decomposition algorithm is described in "Comparison of Daubechies, Coiflet, and Symlet for Edge Detection," by Singh et al., SPIE Vol. 3074; 0277-786X; 1997. Sun et al. describe wavelet decomposition in commonly-assigned U.S. patent application Ser. No. 09/323,501 filed Jun. 10, 1999 titled, "Video Object Segmentation Using Active Contour Model with Global Relaxation."

At step 118, one or more deformation processes are executed to locate the object in the current frame being processed. For example, a high level deformation process coarsely defines the object location. Global or local affine deformation processes are used in some embodiments to more precisely define the object. In some embodiments a local segmentation process is performed as a low level deformation process. In one embodiment the local segmentation process connects control points using dynamic programming, such as a segmentation algorithm, which minimizes the sum of the edge energy along the path between control points. In effect, an edge detection algorithm connects these fixed control points using an edge detection scheme (e.g., image contrast thresholds) to trace a curve from one control point to another.

At step 120, the morphological process 70 is performed to refine the mask and set of control points. The mask for the object is now identified for the current image frame. Such mask and set of control points are stored and may be called by another plug-in to display the tracked object for such image frame. The sequence of image frames next is tested to determine if there are any more image frames to process. If not, then the process is complete. If there are more image frames to process, then at step 122 the output template 92 is set to be the initial template for the next frame. The steps 112–122 then are repeated for such next frame—which is now the current image frame being processed.

Meritorious and Advantageous Effects

An advantage of the morphological process is that a more robust mask is achieved for each frame, reducing the accumulation of critical errors from frame to frame. In particular, rapidly moving objects which are troublesome for edge-based object trackers are more readily tracked. Also, regions of low contrast and regions locked onto in the background when trying to identify the object are more readily distinguished and eliminated from the object mask. Accordingly, false edge points are more reliably removed when performing the morphological process after the object tracking and segmentation processes.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A method for tracking an object among a plurality of image frames, comprising the steps of:

altering a template using a first set of constraints to define a search area for locating a boundary of the object within a first image frame of the plurality of image frames, wherein the template comprises a set of control points;

determining an estimated location and estimated shape of the object in said first image frame and revising the template to correspond to the estimated location and estimated shape of the object, the revised template comprising a first mask and said set of control points;

morphologically eroding the first mask to remove extraneous areas having less than a prescribed width;

deriving a final mask from the morphologically eroded first mask;

revising the set of control points to eliminate control points that are not on the boundary of the final mask; and using the revised set of control points and the final mask to define a second image frame template for tracking the object in a second image frame of the plurality of image frames.

2. The method of claim 1, in which said eroding comprises eliminating any pixel in the first mask which does not have all surrounding pixels in the first mask.

3. The method of claim 1, further comprising adding to the morphologically eroded first mask any pixel which has any surrounding pixel within the morphologically eroded first mask to achieve a morphologically dilated mask.

4. A method for tracking an object among a plurality of image frames, comprising the steps of:

altering a template using a first set of constraints to define a search area for locating a boundary of the object within a first image frame of the plurality of image frames, wherein the template comprises a set of control points;

determining an estimated location and estimated shape of the object in said first image frame and revising the template to correspond to the estimated location and estimated shape of the object, the revised template comprising a first mask and said set of control points;

morphologically eroding the first mask to remove extraneous features based on a first test criteria;

deriving a final mask from the morphologically eroded first mask;

revising the set of control points to eliminate control points that are not on the boundary of the final mask; and using the revised set of control points and the final mask to define a second image frame template for tracking the object in a second image frame of the plurality of image frames;

in which the morphologically eroded first mask comprises a plurality of unconnected regions, and wherein the final mask is derived from only one region of the plurality of unconnected regions.

5. The method of claim 4 in which said one region is selected for encompassing a highest number of control points among the plurality of unconnected regions.

6. An apparatus for tracking an object among a plurality of image frames, comprising:

an object segmenter which derives a template of an object to be tracked, the template comprising a mask and a set of control points;

an object tracker for altering the template using a first set of constraints to define a search area for locating a boundary of the object within a first image frame of the plurality of image frames, the object tracker determining an estimated location and estimated shape of the object in said first image frame and revising the template to correspond to the estimated location and estimated shape of the object, the revised template comprising a first mask and said set of control points; and a morphological postprocessor which processes the first mask and said set of control points to define a revised mask and revised set of control points which define the template for a second image frame of the plurality of image frames, the revised mask, relative to the first mask, allowing the object tracker to more accurately track the object among the plurality of frames for a scenario in which the object either one or both of moves or is occluded;

in which the template is a first image frame template, and in which the morphological postprocessor comprises a processor which morphologically erodes the first mask to remove extraneous areas having less than a prescribed width;

derives a final mask from the morphologically eroded first mask;

revises the set of control points to eliminate control points that are not on the boundary of the final mask, wherein said final mask is the revised mask; and uses the revised set of control points and the final mask to define a second image frame template for tracking the object in a second image frame of the plurality of image frames.

7. The apparatus of claim 8, in which said eroding eliminates any pixel in the first mask which does not have all surrounding pixels in the first mask.

8. The apparatus of claim 6, in which the morphological postprocessor further performs a function of expanding the morphologically eroded first mask by adding to the morphologically eroded first mask any pixel which has any surrounding pixel within the morphologically eroded first mask to achieve a morphologically dilated mask.

9. An apparatus for tracking an object among a plurality of image frames, comprising:

an object segmenter which derives a template of an object to be tracked, the template comprising a mask and a set of control points;

an object tracker for altering the template using a first set of constraints to define a search area for locating a boundary of the object within a first image frame of the plurality of image frames, the object tracker determining an estimated location and estimated shape of the object in said first image frame and revising the template to correspond to the estimated location and estimated shape of the object, the revised template comprising a first mask and said set of control points; and a morphological postprocessor which processes the first mask and said set of control points to define a revised mask and revised set of control points which define the template for a second image frame of the plurality of image frames, the revised mask, relative to the first mask, allowing the object tracker to more accurately track the object among the plurality of frames for a scenario in which the object either one or both of moves or is occluded;

in which the morphologically eroded first mask comprises a plurality of unconnected regions, and wherein the final mask is derived from only one region of the plurality of unconnected regions.

10. The apparatus of claim 9, in which said one region is selected for encompassing a highest number of control points among the plurality of unconnected regions.

11. A method for tracking an object among a plurality of image frames, comprising the steps of:

identifying a first mask which is an initial estimate of a shape and location of the object within a current frame, the first mask including a set of control points along an outer boundary of the first mask;

morphologically eroding the first mask to remove mask areas having less than a prescribed width to achieve an eroded mask;

morphologically dilating the eroded mask to achieve a dilated mask;

deriving a final mask from the dilated mask, the final mask being an estimate of the object shape and location for the current frame;

revising the set of control points to eliminate control points that are not on the boundary of the final mask; and using the revised set of control points and the final mask as the first mask and set of control points for a subsequent frame.

12. The method of claim 11, in which said eroding comprises eliminating any pixel in the first mask which does not have all surrounding pixels in the first mask.

13. The method of claim 11, in which said dilating comprises adding to the morphologically eroded first mask any pixel which has any surrounding pixel within the morphologically eroded first mask.

14. The method of claim 11, in which the dilated mask includes a plurality of unconnected areas, and said deriving comprises selecting one of said plurality of unconnected areas as the final mask.

15. The method of claim 14, in which said selected one area encompasses a greatest number of control points among the plurality of unconnected areas.

* * * * *